United States Patent [19]
Erlichson et al.

[11] Patent Number: 5,875,468
[45] Date of Patent: Feb. 23, 1999

[54] METHOD TO PIPELINE WRITE MISSES IN SHARED CACHE MULTIPROCESSOR SYSTEMS

[75] Inventors: Andrew Erlichson, Palo Alto; Neal T. Nuckolls, Cupertino; Gregory L. Chesson, Palo Alto, all of Calif.

[73] Assignee: Silicon Graphics, Inc., Mountain View, Calif.

[21] Appl. No.: 708,298

[22] Filed: Sep. 4, 1996

[51] Int. Cl.$^6$ ........................................... G06F 12/08
[52] U.S. Cl. ............................. 711/143; 711/141
[58] Field of Search ................... 711/130, 133, 711/141, 143, 146, 124

[56] References Cited

PUBLICATIONS

Chong et al., "Performance Analysis of Four Memory Consistency Models for Multithreaded Multiprocessors", Oct. 1995, pp. 1085–1099, IEEE.
Adve et al., "A Comparison of Entry Consistency and Lazy Release Consistency Implementations", 1996, pp. 26–37, IEEE.

*Primary Examiner*—Eddie P. Chan
*Assistant Examiner*—Kevin L. Ellis
*Attorney, Agent, or Firm*—Wagner,Murabito&Hao

[57] ABSTRACT

In a computer system having a number of nodes, wherein one of the nodes has a number of processors which share a single cache, a method of providing release consistent memory coherency. Initially, a write stream is divided into separate intervals or epochs at each cache, delineated by processor synch operations. When a write miss is detected, a counter corresponding to the current epoch is incremented. When the write miss globally completes, the same epoch counter is decremented. Synch operations issued to the cache stall the issuing processor until all epochs up to and including the epoch that the synch ended have no misses outstanding. Write cache misses complete from the standpoint of the cache when ownership and data are present. This allows the latency of writes operations to be partially hidden in any combination of shared cache (both hardware and software controlled), and multiple context processors. The epoch mechanism can be used to build release consistent multiprocessor systems in the presence of shared caches.

21 Claims, 7 Drawing Sheets

METHOD TO PIPELINE WRITE MISSES IN SHARED CACHE MULTIPROCESSOR SYSTEMS

FIELD OF THE INVENTION

The present invention pertains to an apparatus and method for pipelining write misses in cache coherent multiprocessor computer systems.

BACKGROUND OF THE INVENTION

Caching is an accepted technique to increase computer performance while reducing cost. High performance computers are built with a hierarchy of storage devices, the fastest, smallest and most expensive part of the hierarchy being placed closest to the processor, with successively slower, larger and cheaper levels of storage being further away. The innermost level of the hierarchy is the processor registers, with successive levels being primary cache memory, secondary cache memory, main memory and disk. With each further level the cost per byte of the memory decreases and the access time increases. Each level of the memory hierarchy replicates a subset of the memory hierarchy below it.

Caches are effective because programs exhibit spatial and temporal locality. Temporal locality specifies that memory locations that are accessed by a processor tend to be accessed again soon. Spatial locality specifies that memory locations that are accessed by a processor tend to be near memory locations that will be accessed soon. Caches are cost effective because they limit the amount of faster more expensive storage that must be used to obtain a certain performance point. The processor attempts to access all memory from the closest level of the hierarchy, going to the next level of the hierarchy only when the closer level does not contain the data.

Multiprocessor systems with multiple processors and shared global memory also use caches to reduce memory latency. FIG. 1 contains a logical representation of a distributed multiprocessor with caches, one per processor. The memory is physically distributed among the processors, but is addressed as one large shared memory through the network.

The presence of multiple caches permits multiple copies of the data and introduces an additional level of complexity. Data can become out-of-date in one cache because another processor has written the same data in another cache. To keep the caches coherent (see J. Archibald and J. L. Baer, An Economical Solution to the Cache Coherence Problem. In *Proceedings of the 12th Annual International Symposium on Computer Architecture*, pp. 355–362, IEEE, New York, June 1985.) so that all processors always use the most up-to-date version of a piece of data, cache coherency algorithms are used.

For scalable machines with distributed memory, an invalidation-based single writer protocol (see L. Censier, and P. Feautrier, A New Solution to Coherence Problems in Multicache Systems, IEEE Transactions on Computers, C(27):1112–1118, 1978.) is often used to provide coherency. Under such protocols, each cache keeps track of the state of each cache line. A cache line is either in the readable state, the writeable state or the invalid state. In the readable state, the cache line can be read by a processor, but not written. In the writeable state, it can be read and written. In the invalid state it can be neither read nor written. A cache line can be in the readable state in multiple caches simultaneously but can be cached in the writeable state by at most one cache.

The cache which contains the line in the writeable state is said to be the owner of the line. The ownership information for memory is tracked by a distributed set of directories, or by a central directory. For a processor to write a cache line, all other cached copies elsewhere in the system must be invalidated. Those caches that are invalidated will subsequently take cache misses if the cache line is accessed again, fetching the most up-to-date copy of the cache line from the last writer.

In large multiprocessor systems, cache misses that interact with remote caches can take a long time, relative to processor operating speeds. It is, therefore, desirable to overlap the long miss latency with further computation. To overlap miss latency with subsequent computation, write misses are often pipelined such that the processor resumes operation before the write miss is complete (see D. Lenoski, J. Laudon, K. Gharachorloo, W. D. Weber, A. Gupta, J. Hennessy, M. Horowitz and M. Lam, The Stanford DASH Multiprocessor. *IEEE Computer*, 25(3):63–79, March 1992., and J. Kuskin, D. Ofelt, M. Heinrich, J. Heinlein, R. Simoni, K. Gharachorloo, J. Chapin, D. Nakahira, J. Baxter, M. Horowitz, A. Gupta, M. Rosenblum and J. Hennessy, The Stanford FLASH Multiprocessor. In *Proceedings of the 21st Annual International Symposium on Computer Architecture*, pp. 302–313, April 1994.). In such systems, with multiple caches and multiple processors, a write miss caused by a processor has three distinct parts that can occur partly in parallel.

1. The up-to-date data must be brought into the cache that initiated the miss, if not already present.
2. The ownership of the cache line must be transferred to the cache. The transfer of ownership can be implied in the data arriving in the writeable state.
3. All other caches with readable copies of the cache line must invalidate their copies.

From the standpoint of the cache that initiated the miss, the miss is complete when steps one and two have occurred. At that point ownership is considered to have been transferred to the new cache, the write miss is cleared, and the write miss can be retired from any write buffer, if present. The transaction is not fully complete globally, however, until all other readable copies have been invalidated. Hence, the write miss continues to go on while the processor that caused the write miss resumes operation. In this way, long write latency is partially pipelined with further computation. In addition, the processor write buffer is used more efficiently (if present), since it can retire the write earlier.

In order to guarantee correctness of programs that overlap write latency in the manner described above, a programmer must properly label the program synchronization, whereby all accesses to shared memory are protected by special labeled locks and barriers. Locks and barriers are forms of program synchronization. Properly labeled programs do not expect a data item to be coherent until the synchronization object that protects that object is acquired (see K. Gharachorloo, D. Lenoski, J. Laudon, P. Gibbons, A. Gupta and J. Hennessy, Memory Consistency and Event Ordering in Scalable Shared-Memory Multiprocessors. In *Proceedings of the 17th Annual International Symposium on Computer Architecture*, pp 15–26, May 1990.).

Synchronization operations are further broken down into acquire and release events. Machines that pipeline write misses in the manner described above need to ensure that, before any user synchronization object is released by a processor, all previous writes by that processor are globally complete (steps one, two and three are completed). Such machines are said to operate under the assumption of Release Consistency (see K. Gharachorloo, D. Lenoski, J. Laudon, P. Gibbons, A. Gupta and J. Hennessy, Memory Consistency and Event Ordering in Scalable Shared-Memory Multiprocessors. In *Proceedings of the 17th Annual International Symposium on Computer Architecture*, pp 15–26, May 1990.). Release consistency stipulates that a processor must not release a synchronization object until all writes between the acquire and the release have been globally completed. A write is not globally complete until all other cached copies of the data have been invalidated.

When a write is globally complete, it is visible to all processors in the system: any processor in the system reading the memory location that was written will read the new value. To implement this behavior, a synch memory operation is defined. When a processor issues a synch operation, it stalls until all its previous writes have globally completed. This guarantee is stronger than what is required by release consistency, but easier to implement. To provide user synchronization that conforms to the release consistent model, the user synchronization library routines, for example barriers and lock releases, call synch before attempting to execute the respective synchronization. The synch call does not typically stall the processor, because most writes will have globally completed by the time the processor issues the next synch. In summary, the programmer agrees to conform to the rules of release consistency to obtain better performance.

The synch operation, as described above, for a multiprocessor system with a single processor per cache, is typically implemented using one counter per processor. FIG. 2 shows a possible block-level diagram for a multiprocessor system with one processor per cache, showing one node expanded. The cache controller increments the counter when a write miss occurs and decrements it when a write miss globally completes. System operation provides for signaling to a cache controller when a miss has globally completed. [In a directory based system, either the global completion can be deduced by the requesting node when all invalidation acknowledgments return (see D. Lenoski, J. Laudon, K. Gharachorloo, W. D. Weber, A. Gupta, J. Hennessy, M. Horowitz and M. Lam, The Stanford DASH Multiprocessor. *IEEE Computer*, 25(3):63–79, March 1992.) or the global completion is detected by the home and an explicit message indicating completion is sent to the original requester (see J. Kuskin, D. Ofelt, M. Heinrich, J. Heinlein, R. Simoni, K. Gharachorloo, J. Chapin, D. Nakahira, J. Baxter, M. Horowitz, A. Gupta, M. Rosenblum and J. Hennessy, The Stanford FLASH Multiprocessor. In *Proceedings of the 21st Annual International Symposium on Computer Architecture*, pp. 302–313, April 1994.).] If the processor issues a synch operation, as part of a barrier or lock release for example, the synch operation will stall until the write miss counter decreases to zero.

Systems can also be built with multiple processors sharing a cache (shared-cache systems), as shown in FIG. 3. The system contains multiple nodes where each node contains multiple processors sharing a cache. In such systems it is once again desirable to implement a cache controller such that cache misses can be retired when ownership is returned, before global completion of the write miss occurs. In such systems the counter scheme used in prior art to implement a synch operation will not work (scheme is shown in FIG. 3). If a single counter per cache is used to keep track of the outstanding global misses to that cache, then the counter may not be used by any one processor to guarantee that previous writes have completed, while guaranteeing forward progress: another processor may take a cache miss and increment the counter even after the first processor stalls on the counter, such that it never goes to zero.

A scheme that uses simple per-processor outstanding-miss counters will not work in shared-cache systems either, without changing the processor hit mechanism. For example, take the following case: One processor takes a write miss, incrementing its outstanding-miss counter. The data and ownership return to the cache and the write miss is retired, but global completion of the write continues on in parallel. Another processor attached to the same cache then writes a different part of the same cache line. That write will hit in. the cache, since the write miss has been cleared. However, for correctness, that processor should wait at its next release point until the write miss for that cache line globally completes. But, since its outstanding-miss counter has not been incremented, it will not wait, and incorrect operation will result.

Prior art schemes, therefore, do not permit the pipelining of write miss latency in the presence of shared caches.

Although the problem has been described in terms of hardware multiprocessors sharing a hardware cache, the same problem exists in multiple context processors, where multiple threads of program execution again access the same shared hardware cache.

The problem also exists in shared-memory computer systems that use the virtual memory mapping hardware to maintain coherency on a virtual page basis and have multiple threads of execution accessing the main-memory page cache, on each node [virtual shared-memory systems (see K. Li and P. Hudak, Memory Coherence in Shared Virtual Memory Systems. *Transactions on Computers*, 7(4):321–359, November 1989.)]. The page cache would then by managed by software.

As technology advances, it is likely that hardware shared cache systems with multiple threads of execution per cache will be built. Therefore, there is a need in the prior art for a cache management scheme that can hide write latency while maintaining the memory semantics of release consistency for shared cache, multiple-context and virtual shared-memory systems. The present invention provides a scheme that permits these types of systems to hide write latency by pipelining write misses.

SUMMARY OF THE INVENTION

The present invention hides part of the latency associated with write operations in computer systems having multiple caches with any combination of multiple processors sharing a cache (both hardware and software controlled), and multiple context processors, while preserving the semantics of release consistency for synchronized programs. In the present invention, the write stream to each cache is dynamically divided into separate intervals or epochs. The epochs are demarcated by synch operations: a synch ends the old epoch and begins a new one. When a write miss is detected in a cache, a counter corresponding to the current epoch is incremented. When the write miss globally completes, the same counter is decremented. Synch operations must wait until all previous epochs, up to and including the one that was active before the synch, have zero misses pending within them. Synchs can be used to implement the locks and barriers within the system. The number of epoch counters required per node is equal to the number of processors sharing a cache on that node plus one.

Processors can hide part of the latency of write operations by clearing the cache miss when the data returns to the cache, not waiting until the miss globally completes and all cached copies have been invalidated. Efficiency is increased because global completion of the write miss is overlapped with further computation.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An epoch based cache controller scheme is described. The present invention provides an apparatus and a method of providing memory coherency, specifically cache coherency, in multiprocessor computer systems that utilize multiple processors sharing a cache and in computer systems that are capable of multiple context processing. The present invention further provides the capability of hiding part of the latency of write operations in such systems. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 1:
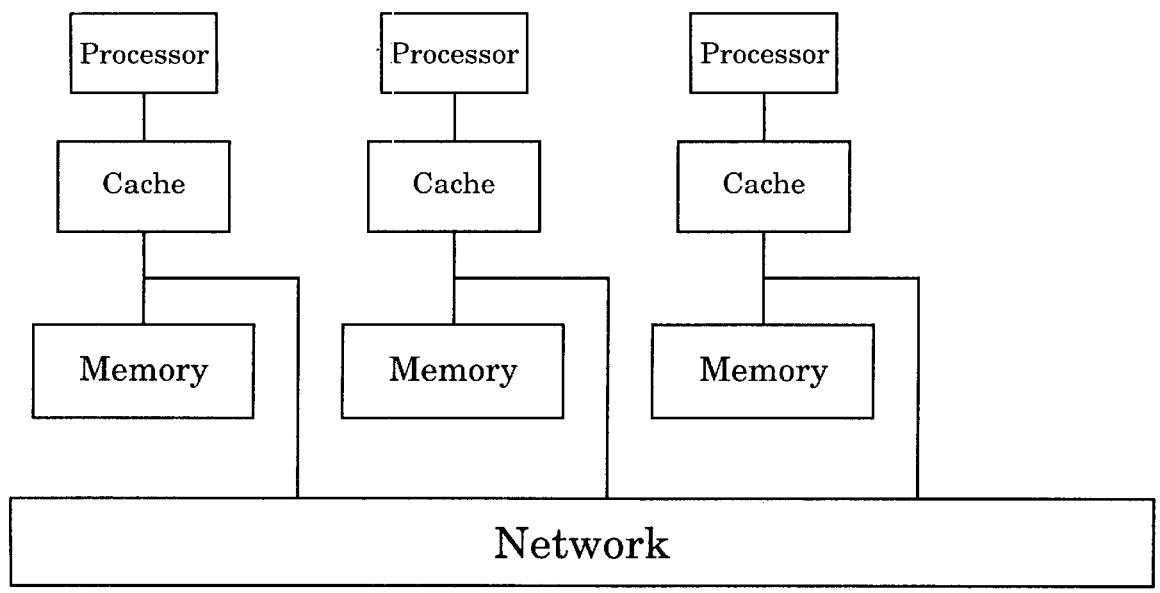
FIG. 1 shows a prior art computer system with multiple processors and multiple caches.
Figure 2:
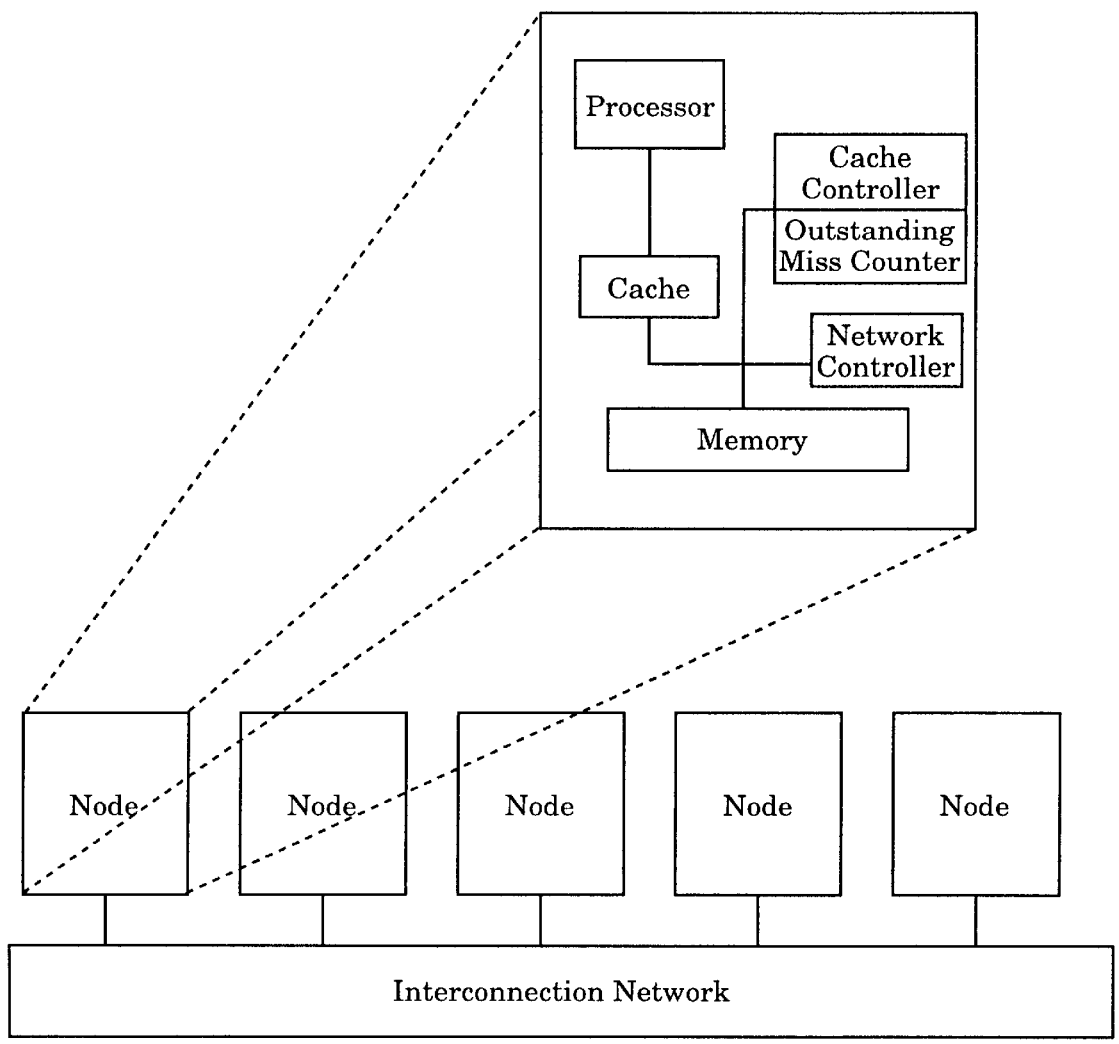
FIG. 2 shows a prior art multiprocessor system with one processor per cache.
Figure 3:
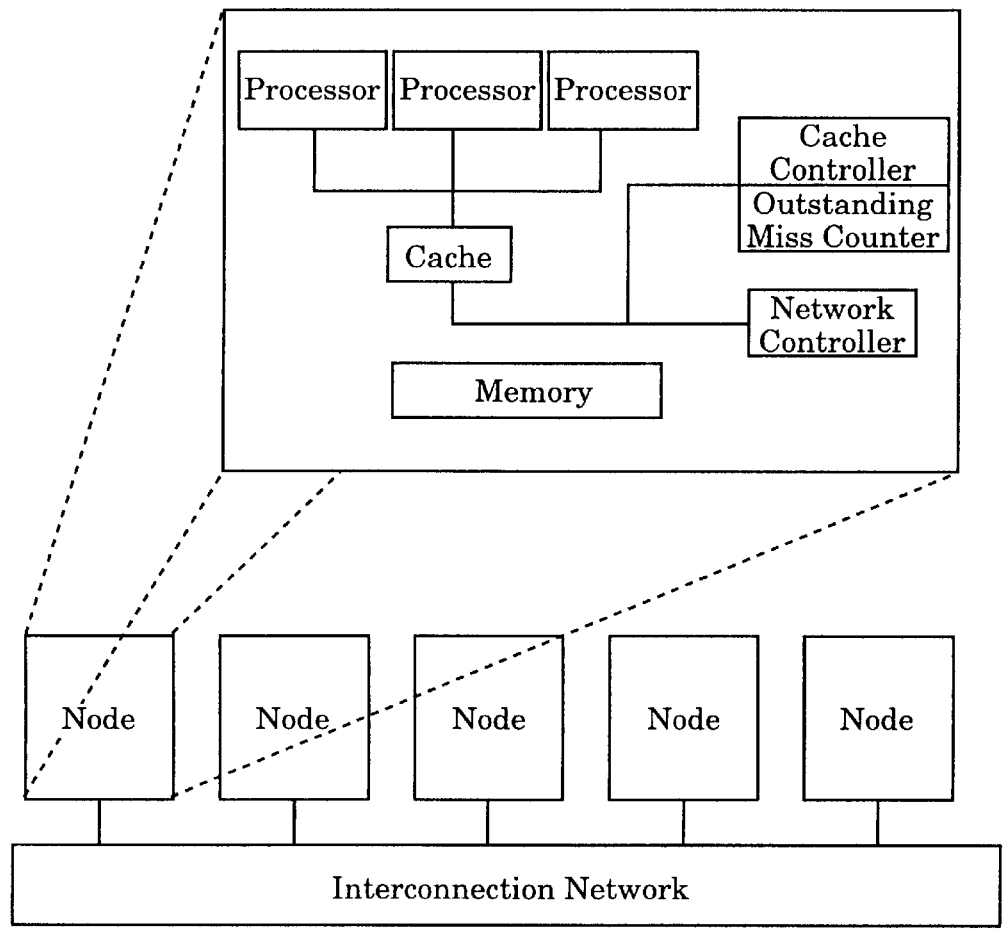
FIG. 3 shows a prior art multiprocessor system with multiple processors per cache.
Figure 4:
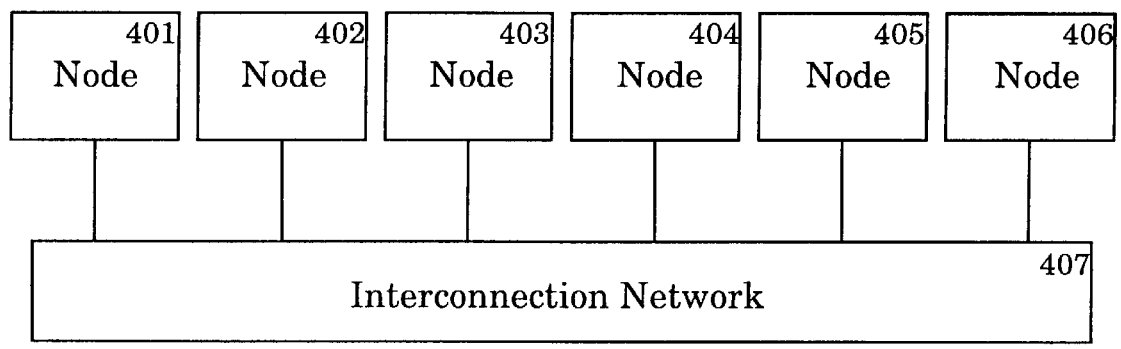
FIG. 4 shows a high level computer system upon which the present invention may be practiced.

FIG. 4 shows a computer system 400 upon which the present invention may be practiced. Computer system 400 includes multiple processing nodes 401–406 for processing data according to a computer program. The present invention can be applied to systems having any number of nodes. Each of these nodes 401–406 includes one cache and one or more processors. These nodes 401–406 communicate with each other and associated shared elements via a general purpose interconnection network 407.

Figure 5:
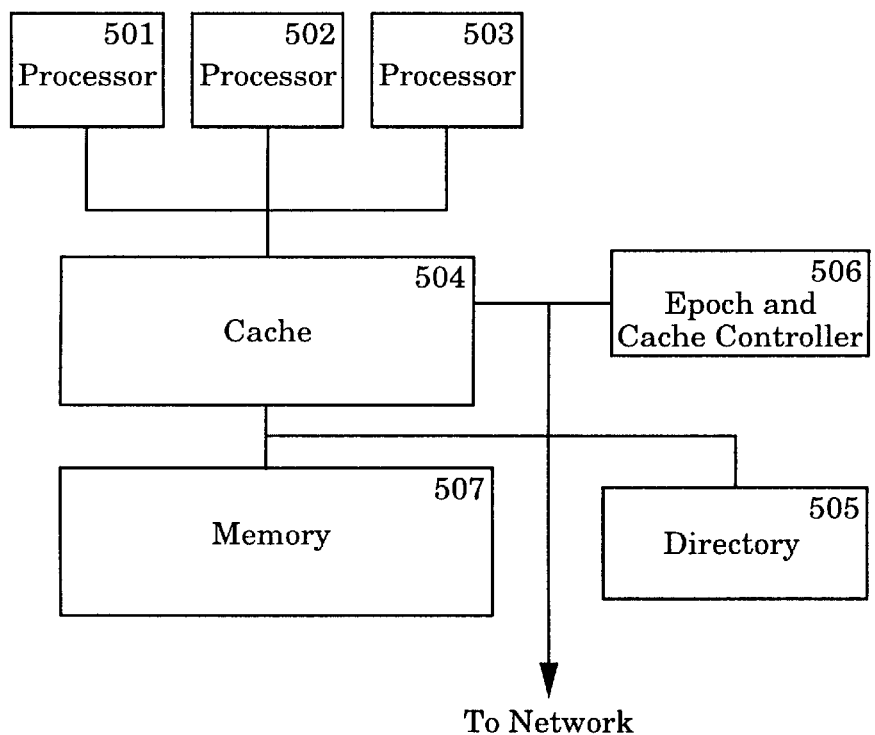
FIG. 5 is a block diagram of a sample node of the computer system in FIG. 4.

FIG. 5 shows a block diagram of a sample node 401. This sample node 401 has three separate processors 501–503. Other nodes of the computer system may have a different number of processors. The processors execute a computer program and perform read, write and synch operations to a single cache memory 504, which is shared amongst the different processors. During a read operation, the executing processor reads the affected content of the cache line, provided that the data being read is valid and in the readable state. For a write operation, the affected content of the cache line is updated by the executing processor. In both read and write operations, processors 501–503 interact with cache memory 504. Only if the data is not found in cache 504 (i.e., a cache miss), will a data transfer occur between cache memory 504 and local memory 507 or between cache memory 504 and remote caches or memory (not shown). A directory 505 is coupled to cache memory 504. Directory 505 contains information regarding the status of the main memory, at cache line granularity: the directory keeps track of which caches in the larger system currently cache the data, and what the state is in each cache. Each cache-line-sized piece of main memory can be in one of three states, readable, writeable or invalid. An epoch and cache controller 506 is used to control the operation of the cache memory 504 and respond to the read, write, and synch operations of the processors 501–503.

An invalidation based directory protocol (see L. Censier, and P. Feautrier, A New Solution to Coherence Problems in Multicache Systems, *IEEE Transactions on Computers*, C(27):1112–1118, 1978.) is assumed to be running within the directory 505 to keep the processors' caches coherent. Invalidation based protocols maintain coherency by permitting at most one cache at a time to have ownership over a cache line. The cache that owns the cache line is permitted to write it. To write a cache line, a cache must first obtain the ownership and the most recent version of the data. A cache line may be in the readable state in multiple caches, but in the writeable state in at most one cache. The states are mutually exclusive: a cache line can not be in the readable and writeable state at the same time.

Figure 6:
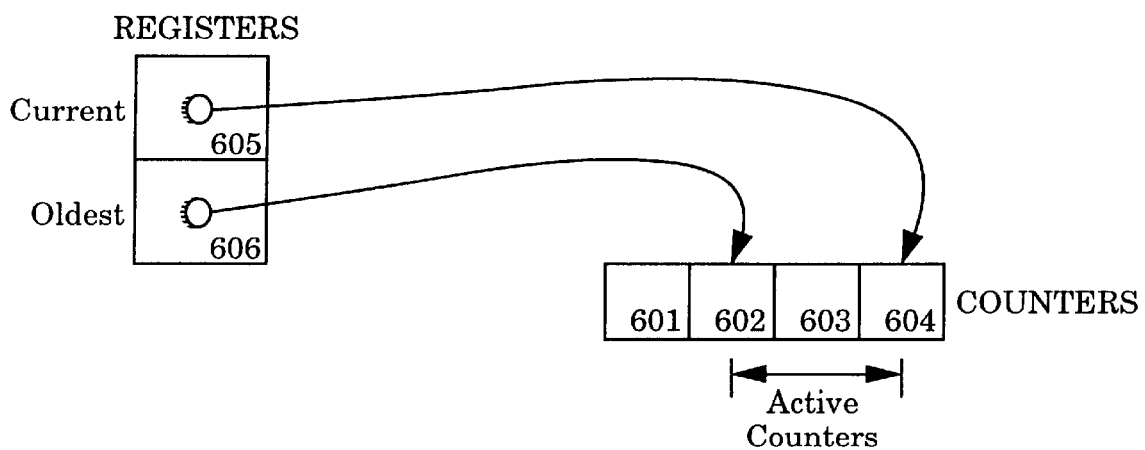
FIG. 6 is a block diagram of the epoch data registers.

The data structures used by the epoch controller 506 are shown in FIG. 6. The epoch controller on each node contains a ring of outstanding-miss counters, 601–604. The number of counters is equal to the number of processors on the node plus one. The epoch and cache controller 506 provide for early retirement of write misses as follows. In the present invention, a processor write stream is divided into ordered epochs, demarcated by synch operations. Each of these epochs are assigned a rotating interval identification number. Write misses to the cache are assigned the identification number of the current epoch, shown in 605. When a processor takes a write miss, the counter corresponding to the current epoch is incremented. The write miss can be retired from the standpoint of the cache (possibly freeing up write buffer space or causing the processor to restart) as soon as the most up-to-date version and ownership of the data arrive at the cache. Once the write miss is retired, subsequent accesses from other processors attached to the same cache will proceed without delay (cache hit). When the write miss globally completes (the write is visible throughout the system) the epoch counter that was originally incremented is decremented. The epoch controller also tracks the oldest epoch, register 606, that has writes not yet globally completed.

Synch operations guarantee correct execution of programs by providing a way for a processor to block until all previous writes to the shared cache, made by any processor on the node, have globally completed. To run a properly labeled synchronized program (see Background section) it is necessary that all of a processor's writes be visible before the processor releases a synchronization object.

The synch operation ends the current epoch but does not retire it. An epoch that has ended but has not yet been retired is said to be closed. An epoch is retired when three conditions are met. First, it is the oldest epoch not yet retired on the node. Second, it is closed: a synch operation has been issued on the node since the epoch began. Third, there are no writes misses that originally occurred during the epoch that have yet to globally complete: the counter corresponding to the epoch is zero.

If a processor is blocked on a synch operation, waiting for all previous epochs to be retired, other processors within the same node can continue to issue read and write operations to the cache, possibly incrementing subsequent epoch counters. Since, on a node with n processors, at most n processors can be blocked on a synch operation, it is only necessary to have as many epoch counters as there are processors on the node. For the implementation shown in this illustration of the invention, an extra epoch counter per node is used to simplify the implementation. For the example node of FIG. 5, there are four epoch counters (shown in FIG. 6), since there are three processors.

A mechanism is required to indicate to a cache that a previous write miss has globally completed throughout the system. Release consistent systems (see D. Lenoski, J. Laudon, K. Gharachorloo, W. D. Weber, A. Gupta, J. Hennessy, M. Horowitz and M. Lam, The Stanford DASH Multiprocessor. *IEEE Computer*, 25(3):63–79, March 1992., and J. Kuskin, D. Ofelt, M. Heinrich, J. Heinlein, R. Simoni, K. Gharachorloo, J. Chapin, D. Nakahira, J. Baxter, M. Horowitz, A. Gupta, M. Rosenblum and J. Hennessy, The Stanford FLASH Multiprocessor. In *Proceedings of the 21st Annual International Symposium on Computer Architecture*, pp. 302–313, April 1994.) provide for this functionality, but do not associate writes with epochs. To match the global-completion message with the original epoch counter that was current when the write miss first occurred, a table can be kept at each node associating cache misses with epochs. When the system indicates that the miss has globally completed the epoch controller can consult the table to recover the epoch identification number. As an alternative solution, the epoch identification number can be sent with all outgoing requests from a node and eventually be echoed back in the final message indicating global completion of the write miss.

Figure 7:
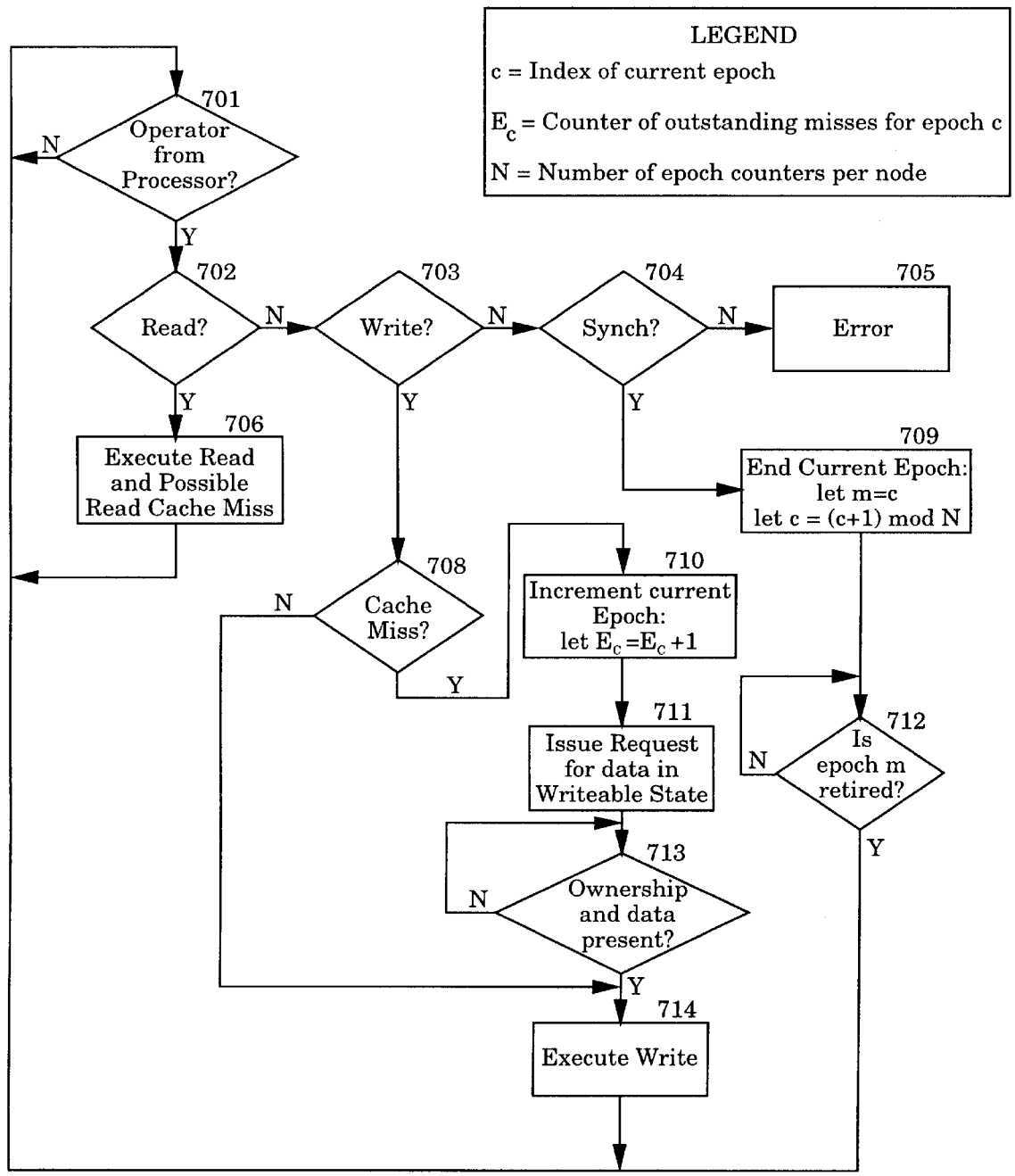
FIG. 7 is a flowchart describing the steps for an epoch-based cache controller.

FIG. 7 is a flowchart describing the steps to handle the requests from a processor on each node, showing how to manipulate the epoch data structures for the various operations. Operations of one of three types are emitted from the processors to the cache, step 701. The three basic types of operations are reads, step 702, writes, step 703 and synch operations, step 704. A read operation does not interact with the epoch structures, and so the details of its operation are shown in summary, step 706. A read will return the affected data to the processor on a cache hit, or perform a read miss on a cache miss.

If an operation is a write, step 703, but hits in the cache, the data is written, step 714, and the overall process is repeated, step 701. If a write operation misses in the cache, the epoch counter, $E_c$, corresponding to the current epoch, c, is incremented, step 710. A write operation can miss because the data is not present in the cache, or because the state is readable instead of writeable. In either event, the cache controller issues a request for the data in the writeable state to the rest of the system, step 711. The cache controller then spins waiting for the ownership and data, if not present, to arrive at the cache. During that time, depending on the design of the system, the processor may still be issuing further memory requests. When the ownership and data are present, the cache miss is considered to have completed from the standpoint of the cache. It is retired, step 714, and the write is executed. Control then returns to the top, step 701.

Synch operations, step 704, cause the current epoch to end, step 709, and a new epoch to begin. The counters are implemented as a ring, so modulo arithmetic is used to determine the index of the next available counter. The epoch controller waits, step 712, until all previous epochs have been retired before allowing the synch to proceed. The synch operation issued by the processor, therefore, guarantees that all previous writes have globally completed.

Figure 8:
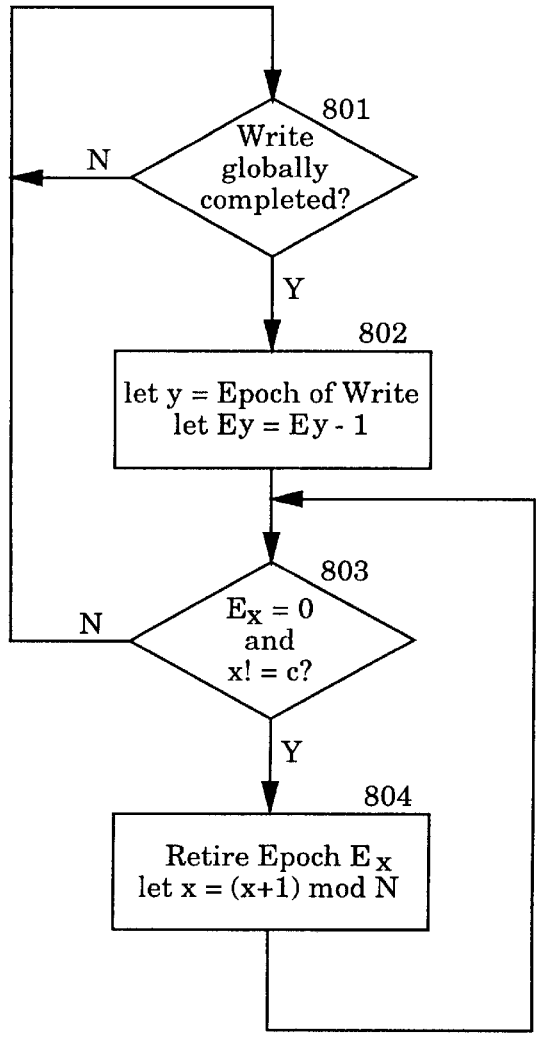
FIG. 8 is a flowchart for the epoch controller that handles global completion of writes.

FIG. 8 shows the flow of steps taken by the epoch controller to retire epochs. Action is initiated at the originating node by notification that a write miss has globally completed in the system, step 801. The epoch counter that was current when the write miss first occurred is decremented, step 802. The epoch controller then tries to retire epochs, step 803, starting at the oldest non-retired epoch. An epoch can be retired if it is the oldest epoch, is not the current epoch and has a count of zero. Steps 803 and 804 are repeatedly executed until a non-eligible epoch is found, at which point the process proceeds back to step 801.

Synch operations, implemented using the epoch method, can be used to code lock releases, barriers and other forms of program synchronization in a shared cache system with multiple processors sharing a cache and multiple caches: the epoch mechanism provides a way of implementing a synch operation in the presence of shared caches, thereby permitting the pipelining of writes.

The epoch mechanism can be used in software shared-memory systems as well as hardware systems. In a software system implemented using virtual shared memory, the virtual memory mapping hardware is used to enforce coherency and a shared software page cache is used on each node. The technique can be used to provide a software synch operation similar to the hardware case.

Figure 9:
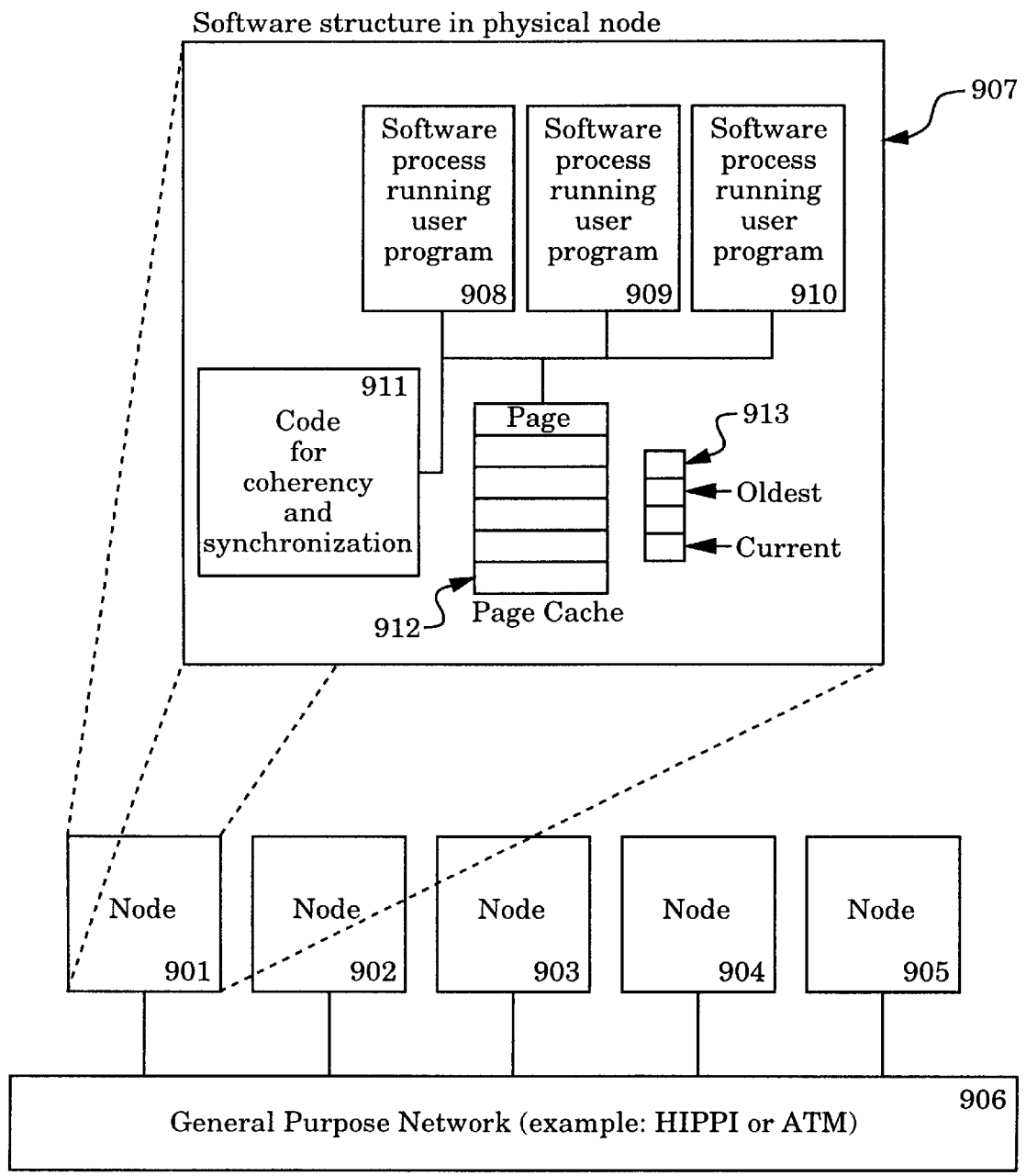
FIG. 9 shows a block diagram of how the epoch based cache scheme of the present invention can be implemented in software.

FIG. 9 shows a block diagram of how the epoch based cache scheme of the present invention can be implemented in software. A software implementation of the present invention using distributed virtual shared memory is shown. The nodes 901–905 are personal computers, workstations, etc., one or more of which have a shared memory configuration. These nodes are coupled together via a network 906. The network can be any general purpose I/O network. In the example, HIPPI or ATM is suggested. A example of the software structures on a node is shown as 907. Node 907 is comprised of one or more processes 908–910, running on one or more processors, not shown. The coherency and synchronization code is shared, shown as 911. The processes 908–910 access a shared software controlled page cache 912, shown divided into an example number of pages. This page cache resides in main memory and part of it might be physically cached by the processors. A number of per-epoch counters of write misses, shown as 913, are used in determining when write misses have globally completed.

The software provides a coherent shared memory environment by detecting write accesses using the virtual memory hardware (see K. Li and P. Hudak, Memory Coherence in Shared Virtual Memory Systems. *Transactions on Computers*, 7(4):321–359, November 1989.). In this particular embodiment, pages in page cache 912 are used in place of cache lines. The synch operation is implemented as a software algorithm corresponding to the flow charts shown in the hardware case. The same benefits that exist in the hardware case are realized in the software case.

In an alternative embodiment, the epoch based cache scheme of the present invention can also be used to hide the latency of writes and synchs in a multiple context processor within a multiprocessor system. Write latency is hidden because the cache retires the cache miss as soon as ownership returns, and the data is available to other contexts within the processor at that time. Synch operation latency is also hidden because the processor can hide the delay associated with a synch by switching to another context and continuing to do work. Writes issued by other contexts will increment epoch counters in epochs after the one on which the pending synch is waiting.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a computer system with multiple aches and a shared main memory, with an invalidation based protocol to keep coherency, a method of providing release consistency comprising the steps of:
   dividing a write stream to a cache into a plurality of ordered intervals, demarcated by a processor issued synch operation;
   detecting a write miss to a cache;
   using an interval counter to track a number of outstanding write misses to the cache that have not yet globally completed;
   stalling the processor issued synch operation at the cache until all intervals, up to and including the one ended by the synch operation, have no write misses outstanding;
   implementing program release synchronization operations using the special synch operation, wherein the releasing of program synchronization objects is proceeded by the synch operation;
   permitting the cache write miss to be retired when ownership returns to the cache.

2. The method of claim 1 further comprising the steps of:
   determining whether previous copies in other caches of the computer system have been invalidated, if necessary to complete the coherency transaction;
   incrementing the current interval counter when a write miss occurs;
   decrementing the interval counter corresponding to the write miss when the write miss globally completes.

3. The method of claim 1 further comprising the steps of:
   generating rotating interval identification numbers;
   assigning an identification number to an interval corresponding to the write miss;
   transmitting the identification number of the current interval with the write miss request;
   transmitting the interval identification number back with the cache response, indicating the miss has globally completed, so that the interval counter can be decremented.

4. The method of claim 1 further comprising the steps of:
   generating rotating interval identification numbers;
   maintaining a table with each cache of the outstanding write misses by cache line memory location and interval identifier;
   looking up the interval when a cache response for a write miss, indicating that a write has globally completed, is received and decrementing the associated interval counter.

5. The method of claim 1 further wherein there are multiple processors directly attached to some of the caches.

6. The method of claim 1, wherein the processor is comprised of a multiple context processor and executes a second thread while the synch operation is pending.

7. The method of claim 1, wherein the main memory includes an SRAM cache.

8. The method of claim 1, wherein the main memory is comprised of pages, wherein access to the pages are made through a translation look-aside buffer, and memory coherency is maintained by virtual nemory hardware on a page basis, the caches being shared virtual page caches, residing in main memory, and cached by physical caches.

9. The method of claim 1 further comprising the steps of:
   retiring an interval when its internal counter goes to zero and the interval is the oldest outstanding interval;
   restarting stalled synch operations when the interval on which the sync operations are waiting is retired.

10. The method of claim 9 further comprising the steps of:
    keeping an oldest pointer pointing to an oldest interval that is not yet retired;
    moving the oldest pointer to point to the next interval counter when the interval being pointed to by the oldest pointer is retired;
    restarting any waiting synch operation corresponding to the oldest interval that has retired.

11. A computer system, comprising:
    a plurality of processors for processing data according to a computer program;
    a shared main memory, wherein each processor can access any memory location;
    a cache hierarchy of caches between each processor and main memory, wherein at least one level of the cache hierarchy is shared amongst multiple processors in the system;
    a circuit coupled to a shared level of the cache hierarchy for dividing a write stream into a plurality of ordered intervals, delineated by a processor issued synch operation;
    a cache controller coupled to the shared cache memory for detecting a write miss;
    a tracking circuit coupled to each shared cache for tracking the number of outstanding write misses in each interval;
    stalling circuit coupled to each shared cache for stalling a synch operation issued by a processor until all intervals before the synch operation have both ended and have no write misses outstanding;
    a coherency circuit for maintaining coherency that is invalidation based.

12. The computer system of claim 11, wherein the tracking circuit decrements a counter corresponding to a write miss when the write miss globally completes, wherein a write miss is considered to have globally completed when all other cached copies of the cache line have been invalidated, ownership of the data has returned to the cache that issued the write miss, and the most up to date copy of the data has been received by the cache that issued the write miss.

13. The computer system of claim 11 further comprising:
    a plurality of counters at each shared cache corresponding to the plurality of intervals;
    a current pointer, at each shared cache for indicating a counter corresponding to the current interval, wherein when the write miss is detected, the current interval counter is incremented;

a sync circuit coupled to each shared cache to process a synch operation, wherein the current pointer is moved forward to the next interval;

an oldest pointer at each shared cache for indicating the oldest interval for which there are still write misses outstanding;

a detector that detects when the oldest interval, as indicated by the oldest pointer, no longer has any write misses outstanding and advances the oldest pointer forward up to the first non-zero interval;

a stall circuit by which a synch operation is stalled until the oldest pointer has been moved forward to point to the same interval as the current pointer.

14. The computer system of claim 11, wherein at least one of the processors is a multiple context processor that executes another thread when the first thread is waiting on a pending release.

15. The computer system of claim 11, wherein program synchronization release operations, corresponding to release points under release consistency, are preceded by a synch operation.

16. The computer system of claim 11 further comprising logic for generating rotating interval identification numbers that are assigned to intervals, wherein the identification numbers are used by the computer system for tracking the status of the write misses;

logic for re-associating a write miss response with the original interval that was current when the write miss first occurred and decrementing an interval counter corresponding to the original interval.

17. The computer system of claim 16 wherein the interval identification numbers are sent along with cache miss requests and which are eventually copied to the cache miss response to the original requester.

18. The computer system of claim 16 wherein a table is kept at each shared cache of all currently outstanding write misses, along with corresponding interval identification number, for purposes of decrementing the proper interval counter when the write miss globally completes.

19. In a computer network having a plurality of nodes and a plurality of cache memories, wherein one of the nodes includes a plurality of processors accessing a single one of the caches, and all the caches are attached to a shared main memory, a method of enforcing release consistency in the caches, comprising the steps of:

dividing a write stream to each cache into a plurality of ordered epochs;

ending the current epoch, and beginning a new epoch at each cache when a processor attached to the cache issues a synch operation to the cache tracking the number of write misses that are outstanding during each epoch;

stalling the synch operation at the cache until all previous epochs have no write misses outstanding.

20. The method of claim 19 further comprising the steps of incrementing a counter corresponding to the current epoch when a cache write miss occurs;

upon a write miss globally completing, decrementing the counter that was current when the write miss first occurred.

21. The method of claim 19 wherein coherency is handled by a distributed directory based coherency protocol.

* * * * *